United States Patent
Boss et al.

(10) Patent No.: US 8,457,700 B2
(45) Date of Patent: Jun. 4, 2013

(54) GPS MAST MODULE AND MOBILE RADIO INSTALLATION

(75) Inventors: Michael Boss, Rosenheim (DE); Roland Gabriel, Griesstätt (DE); Alexander Seeor, Kolbermoor (DE)

(73) Assignee: Kathrein-Werke KG, Rosenheim (DE)

( * ) Notice: Subject to any disclaimer, the term of this patent is extended or adjusted under 35 U.S.C. 154(b) by 221 days.

(21) Appl. No.: 13/131,731

(22) PCT Filed: Nov. 12, 2009

(86) PCT No.: PCT/EP2009/008064
§ 371 (c)(1),
(2), (4) Date: May 27, 2011

(87) PCT Pub. No.: WO2010/060542
PCT Pub. Date: Jun. 3, 2010

(65) Prior Publication Data
US 2011/0237299 A1     Sep. 29, 2011

(30) Foreign Application Priority Data
Nov. 27, 2008  (DE) .......................... 10 2008 059 333

(51) Int. Cl.
*H04M 1/00* (2006.01)
*H04W 4/00* (2009.01)
(52) U.S. Cl.
USPC ...................... 455/575.7; 455/427; 455/562.1
(58) Field of Classification Search
USPC ..................................................... 455/575.7
See application file for complete search history.

(56) References Cited

U.S. PATENT DOCUMENTS

| | | | |
|---|---|---|---|
| 7,031,751 B2 | 4/2006 | Hurler et al. | |
| 7,119,757 B1* | 10/2006 | Lopez | 343/816 |
| 2005/0272439 A1 | 12/2005 | Picciriello et al. | |
| 2007/0063911 A1 | 3/2007 | Davidson et al. | |
| 2008/0055172 A1 | 3/2008 | Chen | |
| 2009/0051608 A1* | 2/2009 | Johnson et al. | 343/713 |

FOREIGN PATENT DOCUMENTS

| | | |
|---|---|---|
| DE | 202005019697 U1 | 3/2006 |
| DE | 4310256 A1 | 10/2011 |
| EP | 1152254 A2 | 11/2001 |
| EP | 1356539 B1 | 1/2002 |
| EP | 1455413 B1 | 9/2004 |
| EP | 1487223 A1 | 12/2004 |
| EP | 1924029 A1 | 5/2008 |
| WO | WO03056873 A1 | 7/2003 |
| WO | WO2008131697 A1 | 11/2008 |

OTHER PUBLICATIONS

Jung, Analyse und Entwurf digitaler Mobilfunksysteme, pp. 230-240 (1997).
International Search Report for PCT/EP2009/008064, dated Apr. 22, 2010.
Written Opinion (foreign-language) for PCT/EP2009/008064, dated Apr. 22, 2010.

* cited by examiner

*Primary Examiner* — Huy C Ho
(74) *Attorney, Agent, or Firm* — Nixon & Vanderhye P.C.

(57) ABSTRACT

An improved GPS mast module is characterized by the following features: the GPS mast module may be connected in a HF main transmission line (7, 107) between a base station (BS) and an antenna assembly (ANT), in particularly a mobile radio installation, and the satellite signals from an internal or connectable GPS antenna (GPS-ANT) can be supplied by a directional coupler (23) to the HF main path (7, 107).

19 Claims, 6 Drawing Sheets

GPS MAST MODULE AND MOBILE RADIO INSTALLATION

This application is the U.S. national phase of International Application No. PCT/EP2009/008064 filed 12 Nov. 2009 which designated the U.S. and claims priority to DE Patent Application No. 10-2008-059-333.8 filed 27 Nov. 2008, the entire contents of each of which are hereby incorporated by reference.

The invention relates to a GPS mast module according to the preamble of claim 1 and a mobile communication system having a GPS mast module of this type according to claim 13.

It is known for mobile communication systems to comprise a mobile communication antenna device and an associated base station.

Mobile communication antennae can radiate and/or receive in one or more frequency bands, for example in a 900 MHz band, in a 1800 MHz band, in a 1900 MHz band, or for example in a UMTS band, thus for example in a range of approximately 1920 MHz to 2170 MHz. In principle there are no restrictions to other frequency ranges.

Established mobile communication antennae thus work with radiators or radiator devices which can for example transmit and/or receive in two mutually perpendicular polarisations. In this context it is also common to refer to an X polarisation, since the two polarisation planes are basically orientated at a +45° angle and a −45° angle to the horizontal plane or vertical plane. Irrespective of this, in the main radiation direction thereof the mobile communication antennae may be set at a radiation angle other than a horizontal orientation, which can preferably be altered within a predetermined angle range in a remotely controllable manner. In this context reference is made to a remotely controllable electronic down-tilt angle adjustment and an associated adjustment device, often also referred to as an RET unit for short.

For example, it can be inferred that a control device of this type is known for example from EP 1 356 539 B1 and an associated method for operating an RET unit of this type is known for example from EP 1 455 413 B1.

Irrespective of the construction of the antenna systems in the region of a base station, it is necessary for the corresponding antenna systems to be synchronised with one another.

In most mobile communication standards the synchronisation of the base station is provided by a network and switching system, also known as an NSS for short and also known as a backbone network.

Satellite signals are not required in this case since the subscribers are synchronised in the respective connection channel. The fundamental properties of a mobile communication system of this type are described for example in P. Jung, Analyse und Entwurf digitaler Mobilfunksysteme, Verlag Teubner, Stuttgart, 1997, pages 231-240.

Synchronisation of this type becomes more complex, i.e. more difficult to manage and more problematic, when a plurality of mobile communication systems are supposed to serve one subscriber, for example in a soft handover as required in a UMTS network, applying the long time evolution (LTE) standard, etc. In other words, there must be a corresponding synchronisation between two adjacent mobile communication cells when a subscriber leaves one cell and enters the next, adjacent cell. There may also be problems with synchronising the moment of switching between transmitting and receiving between a plurality of base stations (TD-SCDMA). In particular, with new standards such as long term evolution (LTE) the requirements on the synchronisation between the different base stations increase considerably. Therefore, to synchronise a plurality of mobile communication base stations, modern methods rely on satellite signals for geostationary position determination, referred to hereinafter as GPS signals, satellite signals or GPS satellite signals irrespective of the respective operator and/or the respective system. This therefore requires a separate GPS receiver which receives, with a separate antenna, the corresponding signals radiated by the satellite and supplies the signal to the base station or transmission unit.

It is further found to be disadvantageous that the base station is often accommodated in shielded spaces or inside buildings, in such a way that conspicuous cable connections to an externally located GPS antenna have to be laid.

The presence of GPS antennae in mobile communication systems can in principle be inferred for example from DE 20 2005 019 697 U1. In this case, the GPS data are received via the GPS receivers or antennae and subsequently passed on to a base station via separate cables.

Instead of providing separate GPS antennae (for example for the above-mentioned synchronisation between a plurality of mobile communication stations), it would also in principle be conceivable to use the same radiation devices provided for the mobile communication operation to receive the GPS signals. However, the antennae or radiators or radiator devices which are used in the respective mobile communication frequency range and are required for transmitting the signals to the mobile subscriber are not optimally adapted for receiving the GPS signal, both because the satellite signals are transferred in a different frequency range and because the GPS signals may for example be circularly polarised whilst the antennae provided for the mobile communication range are intended or adapted for receiving and transmitting linear polarisations. Moreover, the antennae or radiators of a mobile communication antenna device are predominantly orientated towards the ground and not towards the position of the satellite. This would only be the case for example if the antenna were also configured for the GPS frequency range and the available radiators (or some of them) were combined into a preferred circular polarisation.

However, even if the antennae or radiators provided for a mobile communication antenna device were also to be used or could also be used for receiving satellite signals in general or GPS signals in particular, it should be noted that a number of spectral interference signals are present on the supply cable (i.e. what is known as the main HF line) provided between the base station and the antenna device, and would interfere with the GPS signal, which is present at an extremely low level. Although it would also be desirable to use the antennae located on the mast or the devices installed thereon to receive a satellite signal, this therefore leads to a number of problems which thus far have not been solved.

Combination antennae for example are known in the automotive and railway communication sectors, such as the Kathrein antenna 8701011 and an associated GPS amplifier having product number 86010142. Because of the above-mentioned problems and the required high decoupling between the GPS antenna and the mobile communication antenna (and also so as not to overload the reception amplifier for the GPS receiving branch), the signal of the mobile communication antenna device on the one hand and the signals of the satellite or GPS antenna on the other hand are transmitted between the receivers and the transmitter on separate cables. In other words, a separate cable is still required for each receiving branch in this case.

It can be inferred that a device for determining the position of a mobile communication antenna device (GSM antenna device) is known from US 2005/0272439 A1.

In this mobile communication antenna system, the actual antenna is connected to a receiving circuit, and from there to a mobile communication station, via a high frequency transmission and/or receiving signal path. In parallel with this, there is a separate data exchange outside the HF transmission path. Further, a GPS satellite antenna is also provided and is connected via a separate HF line to a primary function GPS switching unit, via which in turn a separate data exchange can be provided outside the HF transmission and receiving path (which leads to the mobile communication antenna).

In principle, a satellite antenna device is also known from EP 1 924 029 A1. In this case, the antenna system comprises an antenna array, it being possible to receive position signals via the individual antenna members so as to determine the orientation of the mobile communication antenna and to carry out an adjustment as a function thereof.

Against this background, the object of the present invention is to provide an improved GPS mast module, i.e. an improved GPS mast device or an improved GPS mast unit, in particular for a mobile communication system, and an associated mobile communication system having a GPS mast module of this type, whereby the evaluation of satellite systems in general and GPS signals in particular can be improved at a low and reasonable expense.

The object is achieved according to the invention by the GPS mast module having the features of claim 1 and by the mobile communication system having the features of claim 13. Advantageous configurations of the invention are given in the dependent claims.

According to the invention, it is provided that instead of the satellite and/or GPS signals being passed on to the base station via a separate line network as in the prior art, the corresponding satellite signals are transmitted to the base station via at least one main high-frequency line, i.e. the at least one high-frequency main line extending between the base station and the antenna device.

Thus, in the context of the invention, the signal received from the satellite or GPS antenna is instead supplied to the at least one main HF line, which extends between the base station and the mobile communication antenna means, via a coupling network. A hybrid coupler is used for this purpose and has a coupling attenuation greater than 10 dB, preferably greater than 20 dB.

Initially, supplying a very weak satellite reception signal into an HF line which is already used for another purpose, with a high coupling attenuation, would appear to be ineffective. However, the following secondary conditions must also be taken into account specifically for a transceiver radio system, resulting in advantages for the solution according to the invention:

low frequency spacing;
intermodulations in the radio system;
oscillation tendency due to feedback (GPS amplifier)
high transmission level in the radio system; and
GPS antenna not in optimum receiving position.

If a coupling network in the form of a hybrid coupler is used, as is proposed in the context of the invention, this has the advantage that the amplified satellite signal can also be supplied to a coaxial supply cable extending between the antenna and a base station, i.e. to the coaxially shielded main HF line extending between the base station and the antenna, by a loose coupling.

Therefore, a GPS signal is referred to in the following when a corresponding satellite signal is meant. The GPS signal thus relates to a global positioning system, i.e. a satellite-assisted system for global position determination. This does not imply a restriction to any particular one of the known or future systems of this type.

It is in particular possible to supply the satellite signal to the main HF line if the mobile communication antenna operates in a frequency range in which the amplified satellite signal (GPS signal) is not radiated or is only radiated at a high attenuation. This avoids expensive filter constructions and preferably supplies the signal towards the base station.

Besides supplying the satellite signal to the main HF line in the original frequency position of the GPS antenna, it is also possible, in an alternative embodiment of the invention, to convert the obtained satellite signals and/or GPS signals into a different frequency position by means of a mixer and to supply them to a corresponding coupling network.

In the context of the invention, a satellite antenna connection means is preferably provided which comprises a satellite antenna or GPS antenna or at least one interface for connecting a satellite antenna or GPS antenna. Said satellite antenna connection means may preferably be connected between a coaxial interface of the main HF line and a further antenna interface. In this case, the satellite antenna or GPS antenna may be integrated as a separate module or integrated into another device, generally located in the vicinity of the satellite antenna, for example a low-noise reception amplifier (TMA), which is generally mounted close to the mobile communication antenna on an antenna mast. Accommodation is also possible in what is known as an RET unit, which as stated at the outset can be provided for remotely controllable adjustment of different radiation angles of the down-tilt angle.

More specifically, the invention is predominantly applied in the disclosed satellite or GPS mast module, i.e. in a mast device or a mast unit, which can in general be mounted close to the antenna on a mast arrangement or another fixing means. The term "mast" is thus to be understood generally as meaning any fixing means for each application position. In this context, this GPS mast module is preferably attached close to the antenna, for example directly below the actual antenna or mobile communication antenna on a mast, where good satellite reception, i.e. GPS satellite reception, is also to be expected. It is thus possible to implement all of the essential features of this device, in such a way that this mast unit according to the invention need only be interpositioned in a coaxial main HF line via the two interfaces provided.

Further advantages, details and features of the invention will become apparent from the embodiments shown in the drawings, in which, in detail:

Figure 8:
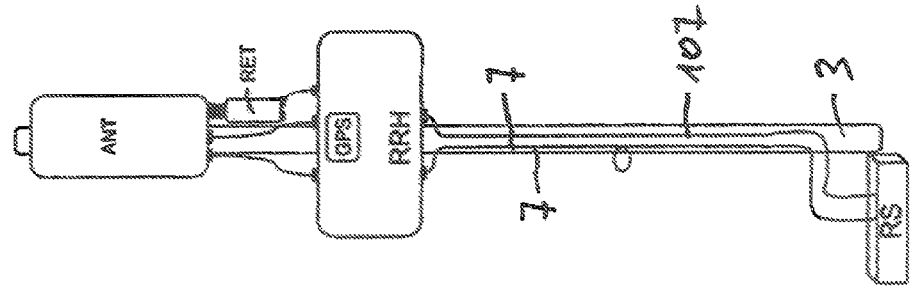
Figure 7:
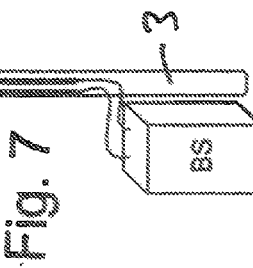
Figure 6:
FIG. 6 is a different view from FIG. 5 to illustrate that the additional device unit (GPS mast module) equipped with at least one GPS antenna can be accommodated in the mobile communication antenna arrangement (inside a radome)

FIG. 7 is a different view from FIG. 6 in which an additional device unit comprising the at least one satellite antenna is accommodated in a low-noise reception amplifier TMA; and FIG. 8 is a further modified view illustrating that for each main HF path, a separate device module comprising at least one satellite or GPS antenna is accommodated in a remote radio head (RRH), a connection to the base station being provided via a glass fibre cable.

Figure 1:
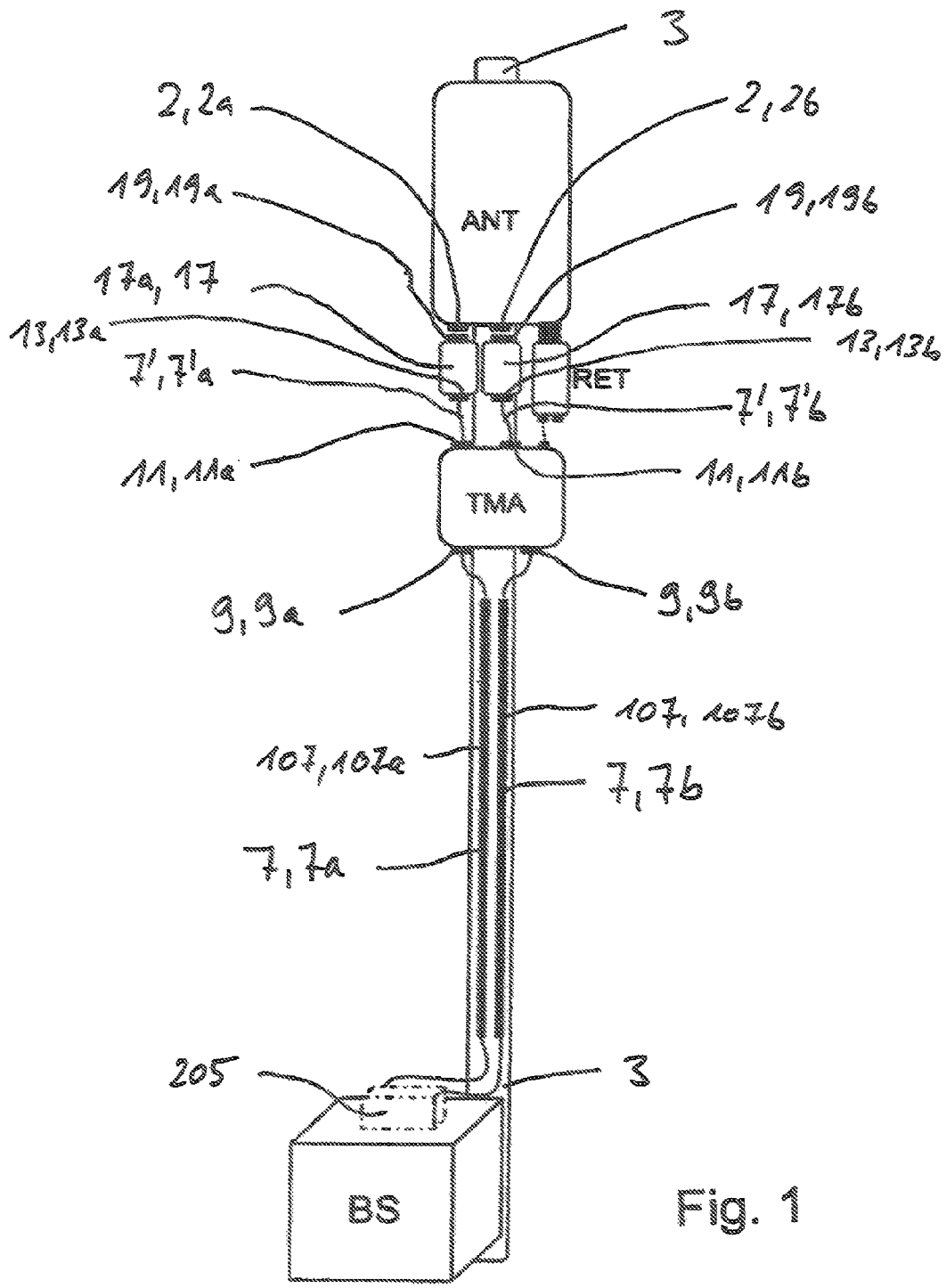
FIG. 1 is a schematic drawing of a mobile communication system according to the invention comprising a mobile communication antenna device, additional devices having GPS devices, a reception amplifier and a base station.

FIG. 1 shows a basic construction of a mobile communication antenna system according to the invention, specifically comprising a ground-side or housing-side base station BS, for example an antenna mast 3, a mobile communication antenna device ANT provided at the top of the antenna mast, generally comprising a plurality of radiators or radiator devices, for example dipole radiators, cross-dipole radiators, dipole squares, what are known as vector dipoles, patch antennae etc. There are no restrictions on the types of radiator. Reference is therefore made to the known radiators and radiator devices, which are for example known for single- or dual-band antennae or even multi-band antennae. Preferably, radiators and radiator devices are used which radiate and/or receive in two mutually perpendicular polarisations and are thus preferably orientated at a ±45° angle to a horizontal plane and/or vertical plane.

The embodiment shown is thus a mobile communication antenna system which radiates in two polarisations, and as a result there are two main HF lines 7, namely 7a and 7b, leading from the base station BS to the antenna device ANT. These main HF lines 7a and 7b are in this case connected to an electric HF interface 9, specifically a base-station-side, electric HF interface 9a or 9b on a low-noise reception amplifier TMA provided for both polarisations.

The low-noise reception amplifier TMA is also provided on the antenna side with two electric HF interfaces 11, i.e. specifically with interfaces 11a and 11b to which intermediate HF lines 7', i.e. intermediate HF lines 7'a and 7'b, are connected, which lead to the two GPS mast units 17 shown in FIG. 1 (sometimes also referred to in the following as GPS master modules 17), i.e. specifically 17a and 17b as a separate unit for each polarisation. For this purpose, each of these two units 17 comprises an interface 13, i.e. an interface 13a or 13b, and these interfaces form the base-station-side connection. On the antenna-side connection positioned opposite, the two units 17a and 17b are each provided with a further interface 19, i.e. 19a or 19b, which may also simultaneously be a connection interface for the mobile communication antenna device ANT, in such a way that no further separate intermediate line is provided in this case. In the embodiment shown in FIG. 1, the GPS mast modules or mast units 17 are connected and attached, for example by the interfaces 19 thereof, to the antenna device ANT directly by connectors having corresponding coaxial connection points or interfaces 2, i.e. 2a or 2b.

In this way, two HF paths 107, i.e. in the embodiment shown an HF path 107a for the first polarisation and a further HF path 107b for the second polarisation perpendicular thereto, are formed between the base station BS and the radiators provided in the antenna device ANT (normally under a radome), and these paths comprise the main HF lines 7a and 7b and the intermediate HF lines 7'a and 7'b as well as the two integrated amplification paths or amplification levels provided in the low-noise reception amplifier TMA and the two GPS mast units or GPS mast modules 17a and 17b shown in FIG. 1 having the integrated signal path.

In this case, the respective GPS mast units or GPS mast modules 17a, 17b are to comprise a satellite antenna, specifically an antenna device also referred to as a GPS antenna, or at least one further interface to which an external satellite antenna or GPS antenna can be connected.

Figure 2:
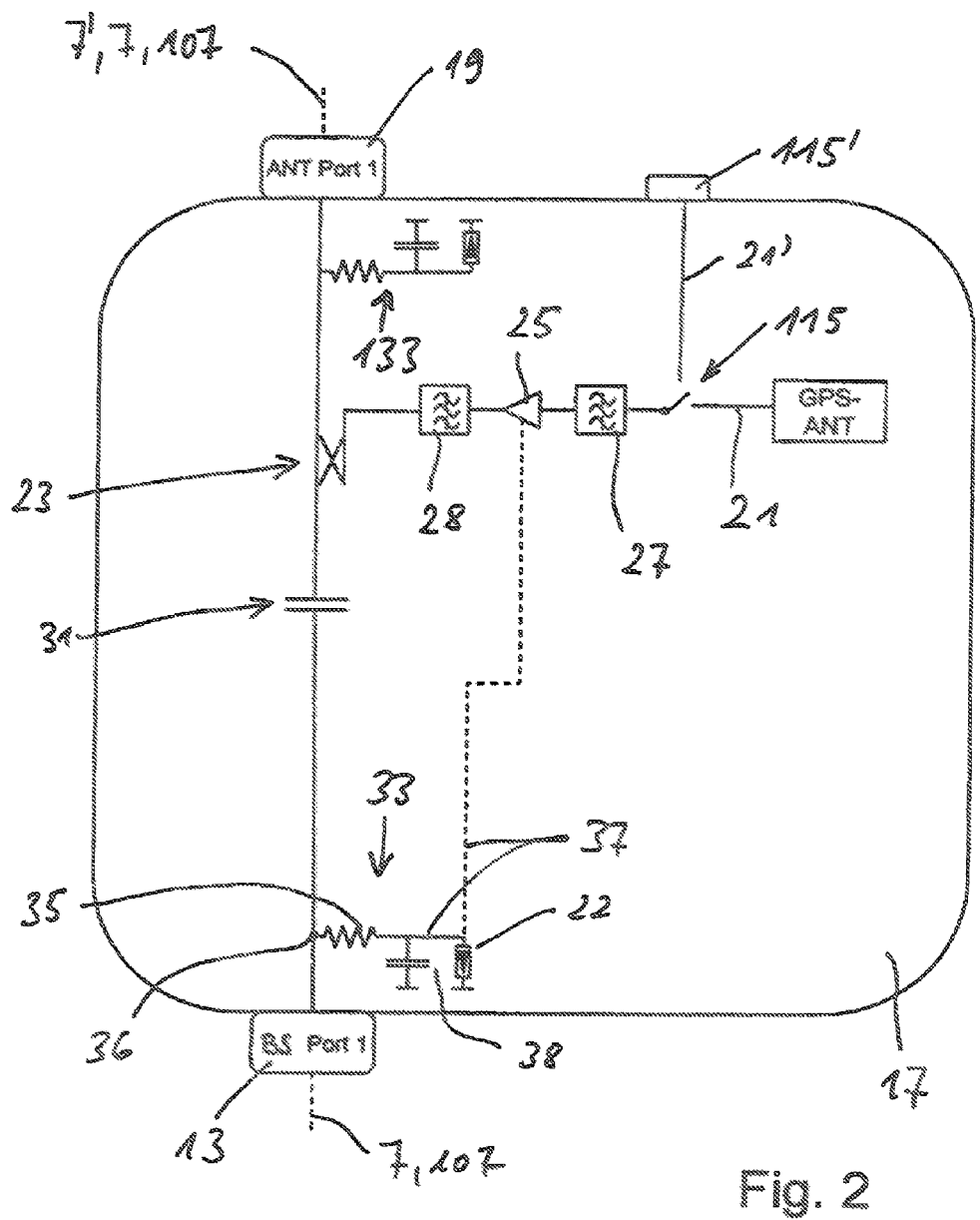
FIG. 2 shows a schematic circuit arrangement of a GPS mast module according to the invention which can be interposed in the intermediate HF path, comprising an additionally integrated or optionally attachable external satellite antenna.

In this context, FIG. 2 is intended to illustrate the rest of the construction in a schematic drawing.

FIG. 2 thus shows a first embodiment of a satellite or GPS mast unit 17 according to the invention, which can be interposed between a base station BS and an antenna device ANT. Preferably, this unit is mounted close to the antenna on a mast or another fixing means. For this purpose, FIG. 2 shows the base-station side connection BS Port1, which represents the base-station-side interface comprising the base-station-side connection 13 of the satellite mast module or GPS mast module 17. The antenna-side connection ANT Port1, which represents the antenna-side interface or the antenna-side connection 19, can also be seen. These two connections 13 and 19 are thus interposed in the main HF path 107, i.e. in the main HF line 7. However, FIG. 2 only shows one of the two main HF paths 107, since in the illustrated embodiment the remainder of the construction is constructed identically for the main HF path 107a and for the main HF path 107b. For simplicity's sake, in the schematic drawing of FIG. 2 the low-noise reception amplifier TMA shown in FIG. 1 is also not shown in the main HF path 107, which comprise the aforementioned main HF line 7, and instead only one of the two satellite mast modules 17, discussed further in the following, is shown.

It can be seen from the schematic drawing of FIG. 2 that in this case a satellite antenna, referred to in the following as GPS-ANT for short, is accommodated in the device 17.

This GPS antenna is connected to a hybrid coupler 23 via a satellite-antenna line 21, specifically with a GPS reception amplifier 25 being interposed. Further, an input-side frequency selection device 27, upstream from the satellite amplifier 25, and an output-side frequency selection device 28, downstream from this amplifier, are provided on the path between the satellite-antenna GPS-ANT and the hybrid coupler 23, and the output-side frequency selection device is in turn connected to the aforementioned hybrid coupler 23.

This structural construction makes it possible for the satellite or GPS signal to be supplied to the satellite-antenna line 21. After pre-filtering by the frequency selection device 27, the GPS signal is amplified by at least 6 dB, preferably by 10 dB and in particular preferably by at least 20 dB, by the GPS reception amplifier 25. It is subsequently supplied to the main HF path 107 via the aforementioned hybrid coupler 23, taking into account the output-side frequency selection filter 28 downstream from the GPS reception amplifier 25. As a result, the GPS reception amplifier 25 is not interfered with by external signals. Moreover, the HF transmission signal, which is transmitted on the main HF line 7 or the main HF path 107 when coming from the base station BS, does not produce any undesired intermodulations at the output of the amplifier 25.

The frequency selection device 27 provided on the input side of the GPS reception amplifier 25, in other words the filter provided in this position, may be a band-pass, a low-pass, a high-pass or a band-stop or a combination thereof, depending on the mobile communication system. This should in particular provide that the GPS reception amplifier 25 is not overloaded, for example by the mobile communication transmission signals. Moreover, a band-pass or stop filter is used at the output of the GPS reception amplifier to suppress sources of spectral interference outside the frequency band used by the satellite signal. In particular, this suppresses the transmission signal of the base station. Similarly, interference signals received from adjacent base stations or mobile subscribers are suppressed.

The satellite or GPS amplifier 25 preferably consists of an overload-proof amplifier, which comprises the aforementioned filter 27 upstream at the input thereof, because the satellite antenna or GPS antenna GPS-ANT being in the direct vicinity of the transmission antenna (mobile communication antenna device ANT) means that a considerable level of interference may still occur in spite of the input filter 27.

As can also be seen from the schematic drawing of FIG. 2, a capacitor 31 is generally also interposed in the main HF path 107, specifically in the satellite mast unit 17, the coupling-out path of the hybrid coupler 23 being provided between the capacitor 31 and the antenna device ANT, i.e. between the capacitor 31 and the antenna-side Port1, i.e. the connection or the interface 19, so as to decouple the direct-current voltage of the antenna. If a direct-current voltage is required for the antenna, this capacitor may also be dispensed with, unless a further direct-current supply is provided separately on the path leading to the antenna ANT from the capacitor 31, as is also provided in an embodiment explained in greater detail in the following.

If a hybrid coupler 23 is used, a further coupling-out is also additionally provided for the direct-current voltage which is required across the main HF path 107 coming from the base station BS for the electrical power supply of the additional components, including the GPS reception amplifier 25.

For this purpose, in FIG. 2 a bias tee in the form of a diplexer 33 is provided in the main HF line 7, and couples out the high frequency HF, coming from the base station via the main HF line 7 (main HF path 107), via the capacitor 31 to the mobile communication antenna device ANT, whilst the supply voltage and/or low frequency data signals coming from the base station via the main HF line 7 are carried off by an inductor 35. Since a further capacitor 38 is provided downstream from the coil 35 in the branch wire 37, the series connection of the coil and the capacitor also acts as a low-pass which additionally separates the high frequency HF from the low-frequency coupling-out. Further, an overvoltage protector 22 is also provided, and is connected between the supply line 37 (mast) in the same way as the capacitor 38 provided in parallel therewith.

In this way, the supply voltage (direct current) or the low-frequency signals, data signals or control signals can thus be supplied via the aforementioned diplexer 33 (bias tee) at a node point 36 to an NF and/or supply line 37 proceeding therefrom, and are subsequently supplied for example for the operation of the GPS reception amplifier 25.

In FIG. 2, this construction is symmetric in that a further bias tee (diplexer 133) is provided on the connection side to the mobile communication antenna ANT including the aforementioned overvoltage protector 22. This circuit 133 acts as a lightning-protection overvoltage circuit and comprises, similarly to the diplexer circuit 33, a corresponding construction comprising an inductor for a capacitor and an overvoltage protector circuit.

In FIG. 2, an optional satellite connection switch 115 is provided in the GPS mast module 17, and switches an external connection 115' to the satellite receiver 25, taking into account the input filter 27. This provides the possibility of connecting an external satellite antenna, instead of an integrated satellite antenna or GPS antenna GPS-ANT, to the satellite-antenna connection device 17, which then produces, via the connecting line 21' and the switch 115, the connection via the filter 27, reception amplifier 25, downstream filter 28 and hybrid coupler 23 to the main HF path 7, and to supply the GPS or satellite signals for the base station to the main HF path 7 with a loose coupling while preventing the occurrence of intermodulations.

In the context of the construction presently being explained, if a carefully tuned level characteristic is set, which is influenced by the amplification of the satellite amplifier or GPS amplifier 25, by the coupling into the supply or control cable 7 through a stop filter 205 (for example in the form of a stop-band filter) preferably provided on the base station (BS), by a filter 27 upstream from the reception amplifier 25 and by a filter 28 downstream from this reception amplifier 25, the mast position can be used directly to receive a GPS signal. However, this is only possible in the context of the configuration according to the invention of the amplifier arrangement of the satellite amplifier or GPS amplifier, preferably comprising the aforementioned input and output filters 27, 28 and the preferably loose coupling to the shielded coaxial cable, referred to the as the main HF cable, using a hybrid coupler 23.

In this case, the amplification is to be at least 6 dB greater than the coupling attenuation of the coupling network. A filler 28 downstream together with the satellite or GPS amplifier 25 prevents interference to the amplifier and moreover provides that there is no passive intermodulation product which might have a retroactive effect on the supply cable 7. It is therefore also necessary for the amplifier output to be coupled relatively loosely. The GPS antenna GPS-ANT or the associated GPS receiver may in this case be integrated for example into a reception amplifier located on the mast for the mobile communication system (MHA or TMA).

The loose coupling to the coaxial supply cable, i.e. into the main HF line 7 between the low noise reception amplifier TMA and the base station or to the coaxial main HF path 107 between the antenna and the base station is carried out by coupling by means of the aforementioned hybrid coupler, which preferably has a coupling attenuation of more than 10 dB, preferably of more than 20 dB.

Predominantly, however, the satellite antenna or GPS antenna is preferably in a separate device as stated, for example provided integrated into the satellite-antenna connection means 17, or can be connected directly via an interface 115' formed in this position and optionally even installed mechanically.

The aforementioned embodiment of FIGS. 1 and 2 relates to an antenna system, in particular to a mobile communication system comprising a mobile communication antenna device ANT which comprises radiators or radiator devices which radiate in two mutually perpendicular polarisation planes, a separate satellite-antenna connection device 17, i.e. 17a or 17b, having been provided with a separate integrated or connectable GPS antenna GPS-ANT at each of the two input-side interfaces 19a, 19b of the antenna device ANT.

Figure 3:
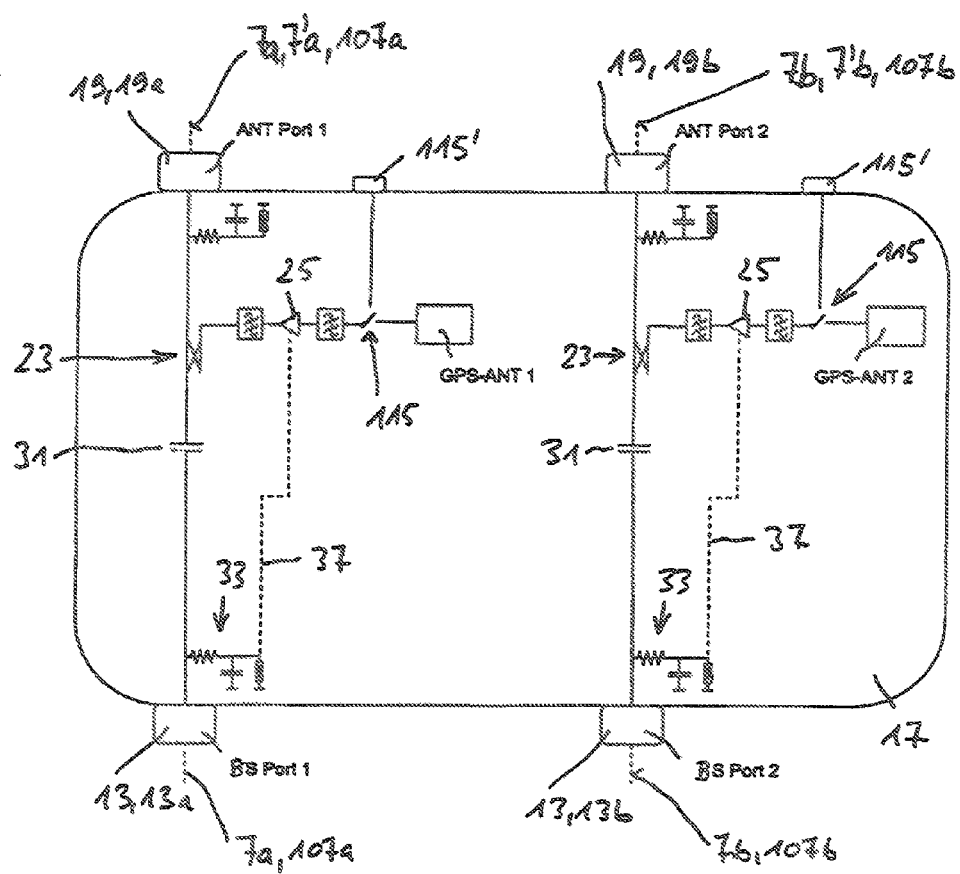
FIG. 3 shows an embodiment modified from FIG. 2, showing two GPS antennae which can be accommodated in a common device in relation to two main HF lines.

FIG. 3 shows that the construction can be carried out using a double unit for the two satellite-antenna connection means 17a and 17b provided separately in FIGS. 1 and 2 for direct connection to an X-polarised antenna, i.e. a mobile communication antenna device ANT comprising radiators and radiator devices or radiator device groups which radiate or are oriented for example at a ±45° angle to the horizontal and/or vertical plane. In this context, like components are provided with like reference numbers, in each case supplemented with the letter "a" for one polarisation plane or component and the letter "b" for the second polarisation plane or component. In this case, a GPS antenna GPS-ANT1 or GPS-ANT2 is provided for each polarisation, and can in each case be switched on or off via a switch 115 associated therewith so as to switch to an externally connected further GPS antenna which is connected to one of the two provided connection points 115'.

A further modified embodiment is discussed in the following with reference to FIG. 4, which in turn basically shows a construction, also shown in a similar manner in FIG. 2 for a GPS mast module 17, as a GPS mast unit 17. However, the variant embodiment of FIG. 4 also further comprises additional elements and variants which are to be discussed in the following.

Figure 4:
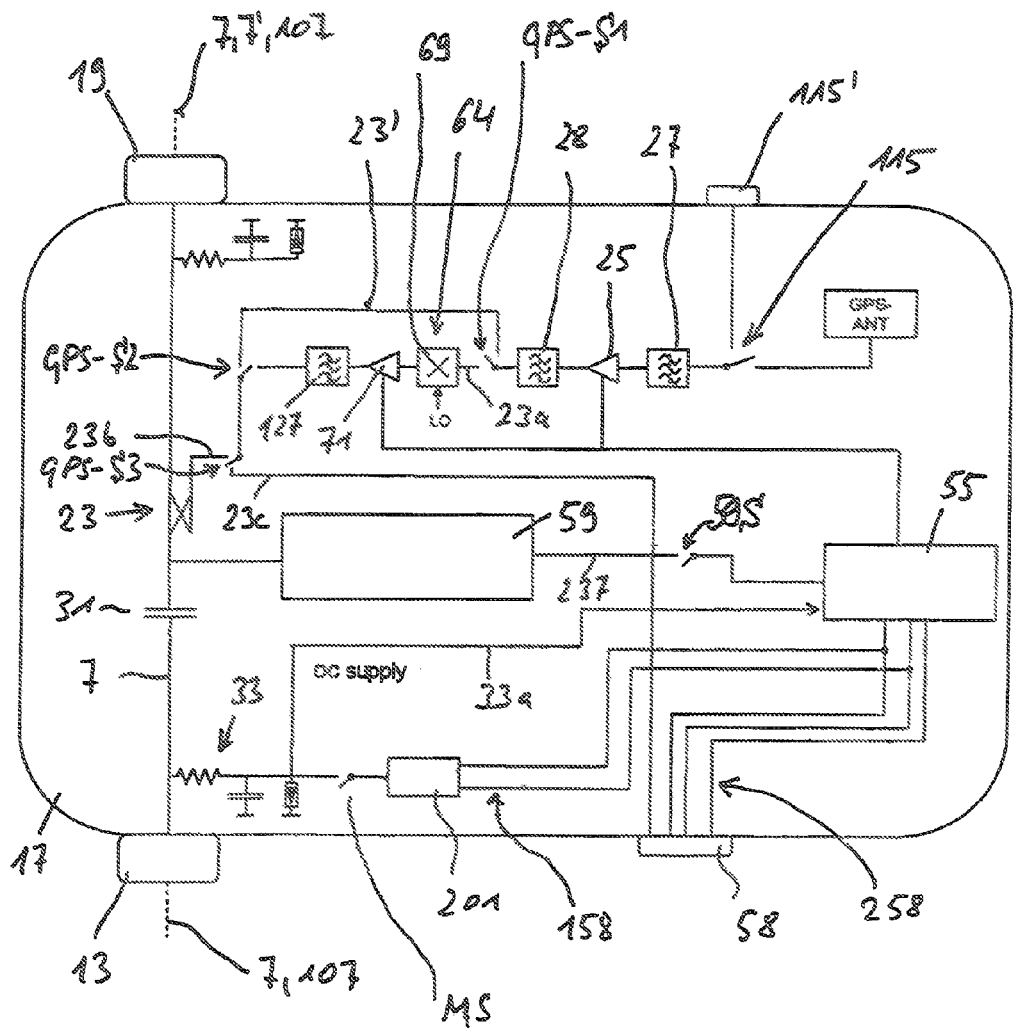
FIG. 4 shows an embodiment developed from FIG. 2.

FIG. 4 further shows a frequency conversion stage 64, comprising an input-side frequency selection means 27 (for example in the form of a band-pass filter), the aforementioned following GPS reception amplifier 25, and the output-side frequency selection means 28 in the form of a further filter stage (also for example in the form of a band-pass filter), as was explained with reference to FIG. 2.

The embodiment of FIG. 4 further shows that as in the variant of FIG. 2 it is possible to select between the internal GPS antenna GPS-ANT or an externally connectable GPS antenna by corresponding switching, by corresponding switching of a GPS antenna switch 115 in the GPS mast module 17, (i.e. the GPS mast unit 17) it being possible for the external GPS antenna to be connected to the connection or the interface 115' on the housing of the GPS mast unit 17.

Further, in the variant embodiments of FIG. 4, further switches or change-over switches are provided, namely a switch GPS-S1 and a further switch GPS-S2. By corresponding switching of this switch pair, the relevant GPS signal can be supplied to the main HF line 7 via a parallel or coupling line 23', as explained with reference to FIG. 2, namely via the hybrid coupler 23. If both of the switches GPS-S1 and GPS-S2 are switched, then further processing of the GPS signal is provided via a mixer and a further amplifier stage.

By means of these switches GPS-S1 and GPS-S2, a connection can thus be provided via the aforementioned coupling line 23' to the aforementioned hybrid coupler 23 (RIKO), which in the embodiment of FIGS. 2 and 3 makes it possible to couple the amplified satellite signal into the relevant main HF line 7 (main HF path 107) correspondingly.

By correspondingly switching the switches GPS-S1 and GPS-S2 into the other switch position (all of the switches shown being actuated for example by an evaluation and/or control electronic circuit 55 provided in the circuit according to FIG. 4), a connection is subsequently produced from the GPS amplifier 25 via the downstream filter stage 28 to the mixer 69 shown in FIG. 4, by means of an effective intermediate line 23a, said mixer being actuated by a local oscillator LO (not shown in greater detail). As a function of the relevant local oscillator frequency, the amplified GPS antenna signal is subsequently converted by the mixer 69 into a different frequency band, predominantly into a different frequency band from the high frequency range which is transmitted in the main HF line or main HF path. Via a further following amplifier stage 71 shown in FIG. 4 and a further downstream frequency selection means 127 (for example in the form of an adapted filter), a connection via an intermediate line 23b to the hybrid coupler 23 or via an alternative intermediate line 23c for example to an AISG interface 58 and from there a connected bus structure to the base station BS is subsequently likewise provided in turn by means of a following switch pair GPS-S2 and GPS-S3.

These switches 115 or GPS-S1 and GPS-S2 result in a large number of different switching possibilities, which may accordingly be summarised as follows:

The received GPS signal can be supplied to the main HF path 7 in the original frequency position via the hybrid coupler 23.

The received GPS signal can be transmitted in the original frequency position via an external further interface. For this purpose, a further switch GPS-S3 is shown in FIG. 4, and can be switched in such a way that a connection is produced to a separate interface 58 via an intermediate line 23c, instead of to the hybrid coupler 23, at the output of the frequency conversion stage.

The received GPS signal can however likewise be supplied to the main HF path 7 via the aforementioned frequency conversion via the hybrid coupler 23.

Likewise, the GPS signal may however also be transmitted after the frequency conversion via the aforementioned external interface 58 after corresponding switching of the further switch GPS-S3.

The construction of FIG. 4 thus further provides the possibility for the direct-current supply for the corresponding electronic components, as described extensively, coming from the base station to be supplied via the main HF path 7 and coupled out of the main HF path 7 via the disclosed bias tee circuit 33. However, it is likewise possible for the direct-current supply for the GPS mast module 17 to be provided via the aforementioned external interface 58.

Further, FIG. 4 also additionally shows a further direct-current (DC) supply circuit and/or control circuit 59, which is connected for example via a line 237, which can be switched to via a switch 59S, to the evaluation control electronic circuit 55, which can in turn likewise be supplied with direct current via the additional interface 58. Via this (DC) supply and/or control circuit 59, a corresponding direct-current voltage, i.e. direct current, can also be supplied to the antenna-side branch of the main HF path 7, i.e. to the portion between the capacitor 31, previously described by way of FIG. 2 and also shown in FIG. 4, and the antenna-side connection or port 19. In this way, it is thus possible to supply direct current to devices which are additionally switched to between this capacitor 31 and the antenna ANT.

Finally, monitoring or control of the GPS mast module and monitoring or control of additional devices between the GPS mast module and the antenna can be carried out and is possible, specifically, via the main HF path 7 and the modem 201 shown in FIG. 4 and/or via the aforementioned external interface 58.

In this case, the modem can for example be switched to or from the main HF path via the bias tee circuit 33 and a switchable switch MS. On the opposite side, the modem 201 is connected via a signal bus 158 to a bus path 258, which in turn extends between the further interface 58 and the evaluation/control electronic circuit 55 (which moreover also provides the direct-current voltage for the GPS reception amplifier 25 and the further amplifier 71 of the frequency conversion stage). Moreover, a direct-current supply via the main HF path 7 and the bias tee stage 33 and the direct-current supply line 33a shown in FIG. 4 is also possible as regards the downstream evaluation/control electronic circuit 55, if this unit does not obtain direct-current voltage via the separate interface 58.

The interface 58 may for example be an AISG interface, it is also possible for this interface to consist of another comparable interface via which another protocol for controlling the antenna, but also for controlling the GPS mast module, can also be transmitted. For this purpose, a corresponding signal bus 258 may thus be provided between the aforementioned interface 58 and for example the evaluation control electronic circuit 55.

Figure 5:
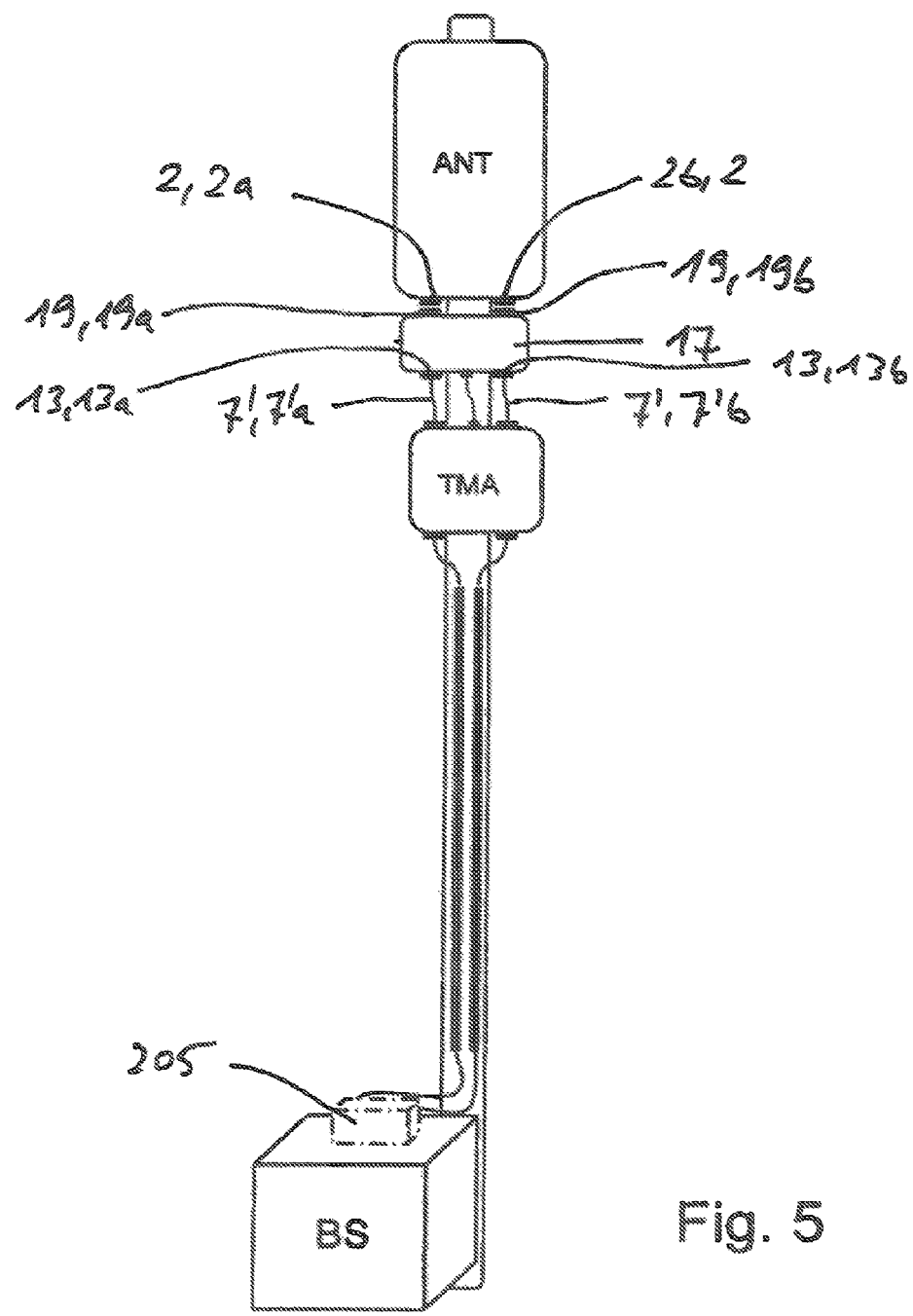
FIG. 5 is a different schematic view from FIG. 1 of an entire mobile communication system according to the invention and construction according to the invention.

The embodiments shown by way of FIGS. 2 to 4 could for example be provided by a mobile communication system such as is shown in a simplified form by way of FIG. 5. In this case, the GPS mast module 17 provided as a double unit (FIG. 3) for both polarisations is interposed between the low-noise reception amplifier TMA for the two polarisations and the mobile communication antenna device ANT, this unit 17 being connected directly by the two antenna-side connections 19, 19a, 19b thereof to corresponding connections or interfaces 2a, 2b of the mobile communication antenna device ANT, and connecting lines 7', i.e. 7'a and 7'b, being provided between the low-noise reception amplifier TMA and the associated connections or interfaces 13a, 13b on the GPS mast unit 17.

In FIG. 5, similarly to FIG. 1, a base-station-side stop filter 205 is again shown, and may be provided in or on the base station BS. This filter is preferably formed as a stop-band filter 205, in particular so as to keep the frequency range of the satellite signal transmitted by the satellite antenna GPS-ANT free of interference spectra. Therefore, the main HF lines 7a, 7b, i.e. the main HF paths 107a, 107b, lead out of the base station via or through this filter 205.

FIG. 6 merely shows that the satellite-antenna connection means 17 can also be integrated into the mobile communication antenna device ANT, generally below the radome.

The variant of FIG. 7 shows that the same device 17 is integrated into the low-noise reception amplifier TMA upstream from the mobile communication antenna device ANT.

The variant of FIG. 8 shows that in this case a single satellite-antenna connection means 17 is provided. This involves a mobile communication system in which a glass fibre line is used instead of a coaxial line for the main HF lines 7, and in this case, a separate direct-current supply line 107 leads from the base station RS to the unit RRH provided in the upper region of the mast where it is supplied via a separate connection. The embodiment of FIGS. 1 and 8 further shows that a further RET unit is also connected to the mobile communication antenna device ANT, and provides remotely controllable electronic adjustment of the radiation angle, whereby in a known manner corresponding phase shifters are actuated within the interior, protected by the radome, of the mobile communication antenna device, and the down-tilt-angle is thus adjusted.

The invention claimed is:

1. Global Positioning System (GPS) mast module comprising:
    at least one satellite antenna (GPS-ANT; GPS-ANT1, GPS-ANT2),
    at least two connections, namely a base-station-side connection and a mobile-communication-antenna-side connection,
    a portion of a main high frequency (HF) path for transmitting HF transmission and/or receiving signals of a mobile communication system extends between the at least two connections,
    the at least one satellite antenna (GPS-ANT; GPS-ANT1, GPS-ANT2) is coupled to at least one portion of the main HF path via a satellite receiving line,
    a low-noise satellite reception amplifier is provided in this satellite receiving line,
    the low-noise satellite reception amplifier has on the output side at least one frequency selector for suppressing one or more mobile communication frequencies of an antenna (ANT) which is or can be connected to the mobile-communication-side connection,
    the supply circuit for the main HF path is constructed in such a way that
        a) a loose connection of the output of the frequency selector to the main HF path is provided by a hybrid coupler, and
        b) the amplified satellite signal is supplied with a coupling attenuation of at least 10 dB by the hybrid coupler, the satellite reception amplifier having an attenuation at least 6 dB greater than the coupling attenuation of the hybrid coupler.

2. GPS mast module according to claim 1, characterized in that the hybrid coupler has a coupling attenuation of at least 20 dB for the main HF path.

3. GPS mast module according to claim 1, characterized in that the satellite reception amplifier comprises at the input thereof a frequency selector for preventing an overload of the satellite amplifier.

4. GPS mast module according to claim 1, characterized in that an intermodulation suppression is provided, specifically
    a) in the form of the hybrid coupler, whereby decoupling with a coupling attenuation of at least 10 dB can be provided, and/or
    b) in the form of a frequency selector at the output of the satellite reception amplifier, and/or
    c) in the form of a frequency selector, consisting of a ceramic material filter or comprising a ceramic material filter, at the output of the satellite reception amplifier.

5. GPS mast module according to claim 3, characterized in that the frequency selector comprises or consists of a bandpass, a low-pass, a high-pass or a band-stop.

6. GPS mast module according to claim 1, characterized in that the satellite signal received via the satellite antenna (GPS-ANT) can be supplied in a converted form to the corresponding portion of the main HF line.

7. GPS mast module according to claim 6, characterized in that the satellite signal received via the satellite antenna (GPS-ANT) can be converted in a frequency range different from the receiving frequency range by a mixer and can be supplied to the corresponding portion of the main HF path.

8. GPS mast module according to claim 1, characterized in that the GPS mast module comprises a bias tee or diplexer circuit, via which a direct-current coupling-out and/or coupling-out of low-frequency signals from the main HF path can be carried out.

9. GPS mast module according to claim 1, characterized in that a further interface and an evaluation and/or control electronic circuit are further provided and are connected via a signal bus.

10. GPS mast module according to claim 1, characterized in that an isolating capacitor is connected between a base-station-side and mobile-communication-antenna-side interface in the GPS mast module in the main HF line/main HF path, and in that
    a) the coupling network is connected on the antenna-side portion of the main HF path for supplying the satellite signal in relation to the isolating capacitor and/or
    b) the bias tee or diplexer circuit is connected to the base-station-side portion of the main HF line/main HF path based on the isolating capacitor.

11. GPS mast module according to claim 9, characterized in that the evaluation and/or control electronic circuit is connected via a control line, which can be switched on, to a direct-current supply and/or control circuit for the direct-current supply and control of electronic components, which can be connected on the antenna-side interface, for which purpose a connecting line is provided between the evaluation and/or control electronic circuit and a corresponding portion of the main HF path in the GPS mast module.

12. GPS mast module according to claim 9, characterized in that a direct-current supply can be provided via the further interface.

13. Mobile communication system comprising at least one satellite antenna (ANT) and one base station (BS), a main HF line/main HF path being provided between the base station (BS) and the satellite antenna (ANT) thereof for transmitting and/or receiving signals, characterized in that a Global Positioning System (GPS) mast module according to claim 1 is connected in the main HF line/main HF path.

14. Mobile communication system according to claim 13, characterized in that a stop-band filter is used in the base station (BS), in particular so as to keep the frequency range of the satellite signal transmitted by the satellite antenna (GPS-ANT) free of interference spectra.

15. Mobile communication system according to claim 14, characterized in that a separate GPS mast module is provided for each polarization in which the mobile communication antenna (ANT) transmits or receives.

16. Mobile communication system according to claim 13, characterized in that a common GPS mast module is provided for two polarizations in which the mobile communication antenna (ANT) transmits and/or receives.

17. Mobile communication system according to claim 13, characterized in that at least one GPS mast module is connected between a mobile communication antenna (ANT) and a low-noise reception amplifier, positioned closer to the mobile communication antenna device and further away from the base station (BS).

18. Mobile communication system according to claim 13, characterized in that at least one GPS mast module is provided in the mobile communication antenna device (ANT), preferably inside a radome.

19. Mobile communication system according to claim 13, characterized in that at least one GPS mast module is provided in a device for amplifying the receiving signals which is connected between the base station (BS) and the mobile communication antenna (ANT), preferably in the vicinity of the antenna (ANT).

* * * * *